United States Patent [19]

Riede

[11] 4,113,625

[45] Sep. 12, 1978

[54] DIFFUSION DEVICE

[75] Inventor: Gerhard Riede, Vellinge, Sweden

[73] Assignee: Gambro AG, Zug, Switzerland

[21] Appl. No.: 802,363

[22] Filed: Jun. 2, 1977

[30] Foreign Application Priority Data

Jun. 11, 1976 [SE] Sweden ............................... 7606623

[51] Int. Cl.$^2$ ............................................ B01D 31/00
[52] U.S. Cl. ................................. 210/321 B; 210/541
[58] Field of Search ............... 210/321 B, 321 R, 541;
23/258.5 R; 55/158; 159/DIG. 27, DIG. 28

[56] References Cited

U.S. PATENT DOCUMENTS

| | | | |
|---|---|---|---|
| 3,734,298 | 5/1973 | Riede | 210/321 B |
| 3,837,496 | 9/1974 | Hagström et al. | 210/321 B |
| 3,841,491 | 10/1974 | Hagström et al. | 210/321 |
| 4,016,082 | 4/1977 | Riede et al. | 210/321 B |
| 4,051,041 | 9/1977 | Riede | 210/321 B |
| 4,062,778 | 12/1977 | Riede | 210/321 B |

*Primary Examiner*—Frank A. Spear, Jr.
*Assistant Examiner*—E. Rollins Cross

*Attorney, Agent, or Firm*—Lerner, David, Littenberg & Samuel

[57] ABSTRACT

An apparatus for diffusing matter between a first and second fluid is provided and includes a plurality of spacer plates and a plurality of pairs of semipermeable membranes arranged in a stacked configuration. The spacer plates and semipermeable membranes each include first and second openings which, in the stacked configuration, form first and second vertical flow passages for the first and second fluids, respectively. In addition, the spacer plates include grooves formed in the upper and lower surfaces thereof so that in the stacked configuration, the grooves cooperate to form first horizontal flow passages between the membranes and the spacer plates which are connected to the first vertical flow passage. The pairs of semipermeable membranes are disposed within the grooves to form second horizontal flow passages between the membranes which are connected to the second vertical flow passage, with the second horizontal flow passages being disposed within the first horizontal flow passages.

9 Claims, 14 Drawing Figures

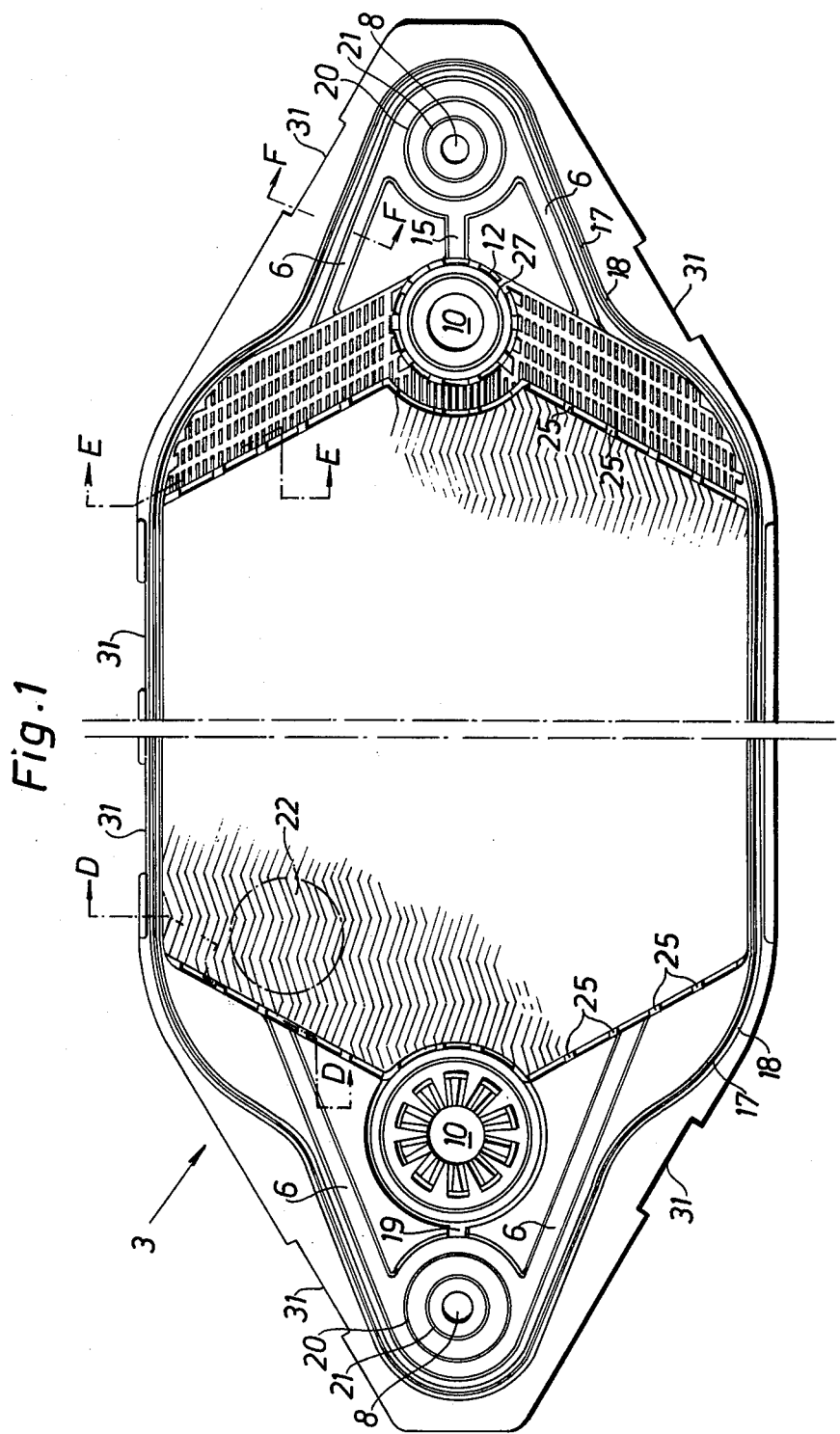

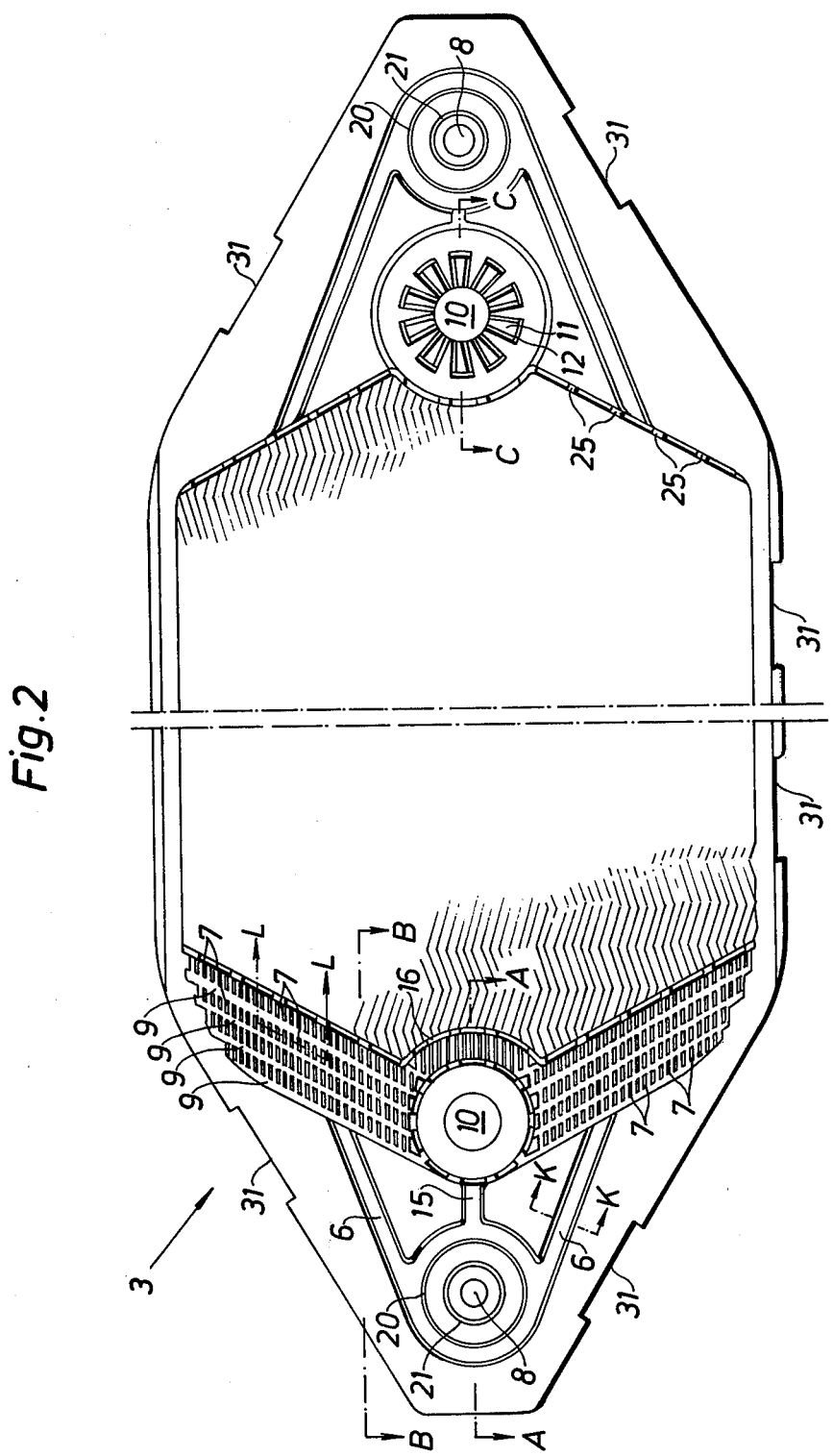

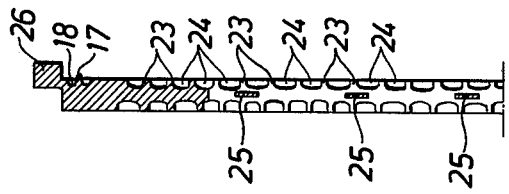
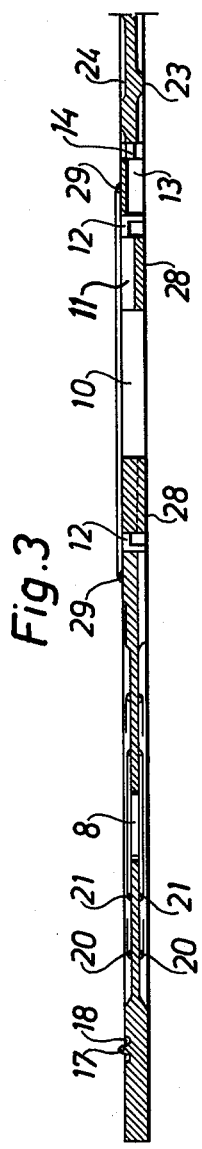
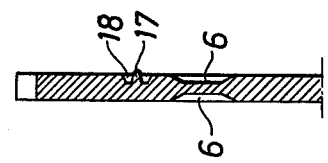
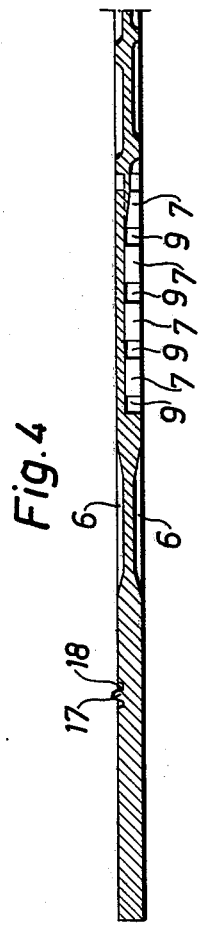
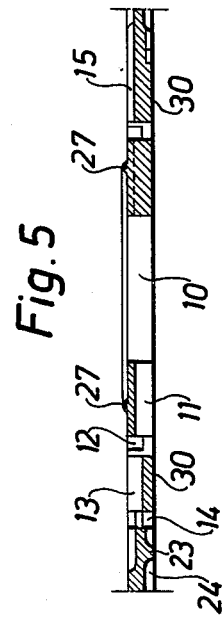

DIFFUSION DEVICE

FIELD OF THE INVENTION

The present invention relates generally to apparatus for diffusing substances between two fluids via semipermeable membranes, and specifically to an improved device which provides an improved flow of the two fluids.

BACKGROUND OF THE INVENTION

Apparatus for the diffusion of substances between two fluids via semipermeable membranes are well known, and various constructions are shown in U.S. Pat. No. 3,411,630; U.S. Pat. No. 3,501,011; U.S. Pat. No. 3,511,381; U.S. Pat. No. 3,516,548; and U.S. Pat. No. 3,734,298. In such patents, the membranes are arranged in pairs between each pair of adjacent spacer plates, with one fluid, such as blood, being conducted between the membranes, while another fluid, such as purifying liquid or oxygen, is conducted outside the membranes between the membranes and the adjacent spacer plates. However, there also exists in the prior art, dialysis devices which include alternately-arranged single membranes disposed between single spacer plates.

Such prior art constructions have had problems with respect to achieving a satisfactory emptying of the fluid from the devices following their use. This problem is particularly significant when the device is used for the purification of blood, and the maximum amount of blood possible must be returned to the patient when the device is emptied.

Broadly, it is an object of the present invention to provide an improved device which overcomes the aforesaid problem. Specifically, it is within the contemplation of the present invention to provide an improved device which is constructed to provide a more complete emptying of the fluid from the device after its use and includes horizontal flow passages laid out in the shape of a V, and wherein vertical flow passages are preferably located as close as possible to the point of the V.

SUMMARY OF THE INVENTION

An apparatus for diffusing matter between a first and second fluid is provided which includes a plurality of spacer plates and a plurality of pairs of semipermeable membranes arranged between the spacer plates in a stacked configuration. The spacer plates and the semipermeable membranes each include first and second openings so that in the stacked configuration, the first and second openings form first and second vertical flow passages for the first and second fluids, respectively. The spacer plates include grooves formed in the upper and lower surfaces thereof so that in the stacked configuration, the grooves cooperate to form first horizontal flow passages between the membranes and the spacer plates which are connected to the first vertical flow passage. In addition, the pairs of semipermeable membranes are disposed within the grooves to form second horizontal flow passages between the membranes which are connected to the second vertical flow passage. The second horizontal flow passages are disposed within the first horizontal flow passages to provide for the improved flow of the first and second fluids within the device to achieve a more complete emptying of the fluids from the device when it is turned on its edge.

In a preferred embodiment, the spacer plate includes a central portion having working surfaces and end portions on each end of the central portion. The grooves in the spacer plates which form the first horizontal flow passages are laid out in substantially the shape of a V in each of these end portions of the spacer plate. Each of the V-shaped areas may enclose the first and second vertical flow passages, with these flow passages being arranged along the bisectrix of the V, with the second vertical flow passage being arranged closest to the point of the V.

In addition, in the preferred embodiment, grooves are provided in the surface of the spacer plate between the first and second vertical flow passages along the bisectrix of the V in order to improve the emptying of the second fluid from the device when it is emptied by being turned on its edge.

Moreover, in a preferred embodiment of the invention, the spacer plates are provided, on at least one surface, with a continuous sealing flange extending along the periphery thereof and in which the V-shaped areas extends closely along the V-shaped grooves. The sealing flange may be also arranged in a recess formed within the spacer plate which is shallower than the sealing flange is high which makes it possible to more readily compress the sealing flange when the spacer plates are stacked and thus to achieve a better seal without requiring any additional space within the stack of spacer plates.

In an alternative embodiment, at each end of the spacer plate, two V-shaped groove arrangements may be provided, and the angles of each of the V-shaped areas may be different. In addition, a vertical flow passage may be disposed close to the point of each of the V-shaped areas.

BRIEF DESCRIPTION OF THE DRAWINGS

Further objects, features, and advantages of the present invention will become apparent upon the consideration of the following detailed description of a presently-preferred embodiment, when taken in conjunction with the accompanying drawings, wherein:

FIG. 1 is a top view of a spacer plate embodying the principles of the present invention;

FIG. 2 is a bottom view of such a spacer plate;

FIG. 3 is a cross-sectional view taken along the line A—A in FIG. 2 illustrating the openings which form the vertical flow passages;

FIG. 4 is a cross-sectional view taken along the line B—B in FIG. 2 illustrating in detail the grooves in the spacer plate which are laid out in the shape of a V;

FIG. 5 is a cross-sectional view taken along the line C—C in FIG. 2 illustrating in detail the passageways and seals surrounding an opening in the spacer plate;

FIG. 6 is a cross-sectional view taken along the line F—F in FIG. 1 illustrating in detail the grooves in the spacer plate which cooperate to form the horizontal flow passages;

FIG. 7 is a cross-sectional view taken along the line D—D in FIG. 1 illustrating the working surface of the spacer plate and the manner in which it is connected to the V-shaped areas of the spacer plate;

DETAILED DESCRIPTION OF PREFERRED EMBODIMENT OF THE INVENTION

Figure 12:
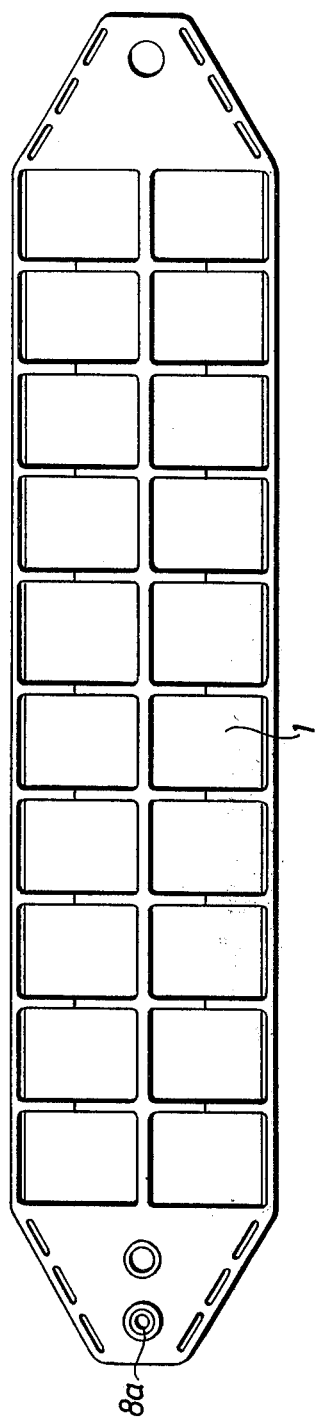
FIG. 12 is a top plan view of an apparatus in accordance with the present invention.
Figure 13:
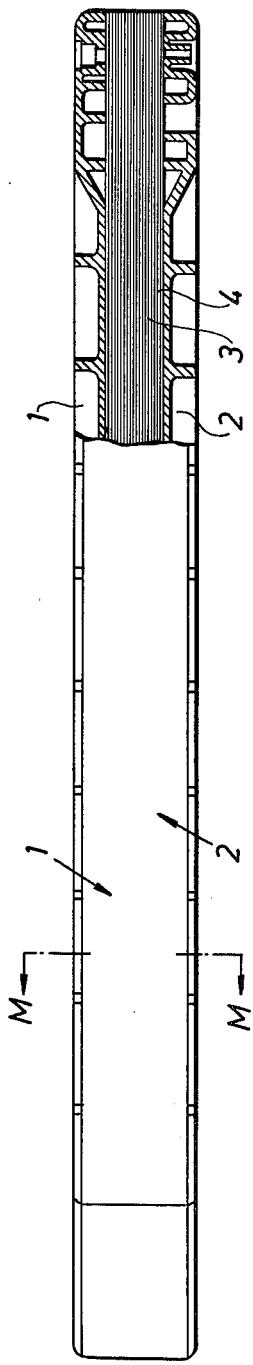
FIG. 13 is a side elevation, partially broken away for the purpose of illustrating the stacked arrangement, of the apparatus of FIG. 12.
Figure 14:
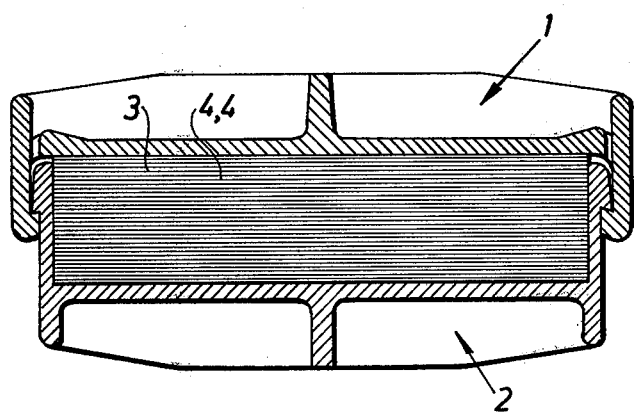
FIG. 14 is a cross-sectional view taken along the line M—M of FIG. 13.

Referring now to the drawings, and in particular, FIGS. 12 through 14, the apparatus is shown to include a top member 1 and a bottom member 2 with spacer plates 3 disposed between top and bottom members 1, 2 and pairs of membranes 4, 4 disposed between each of the spacer plates 3 in a stacked configuration.

Referring to FIG. 1, a top view of spacer plate 3 is shown, and referring to FIG. 2, a bottom view of spacer plate 3 is shown. In the stacked configuration of the spacer plates 3, the surface of the spacer plate shown to the left in FIG. 1 rests against a surface of substantially the same kind, such as that shown to the right in FIG. 2. In the same way, the surface shown to the left of FIG. 2 and the right of FIG. 1 will rest against one another. In stacking the spacer plates 3, they are alternately turned 180° in their own plane, in the manner as described in detail in U.S. Patent Application Ser. No. 592,666 (corresponding Swedish Application No. 365,119).

As will be seen in FIG. 3, the spacer plates 3 each include openings 8, 10 for the passage of fluids. When the spacer plates 3 are arranged in their stacked configuration, the openings 8, 10 form vertical flow passages for the flow of the fluids in a vertical direction within the apparatus. It will also be understood that the semipermeable membranes 4 also include openings (not shown) corresponding to openings 8, 10 which, in the stacked configuration, also form a part of the vertical flow passages 8, 10.

Figure 10:
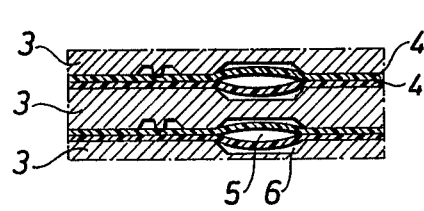
FIG. 10 is a cross-sectional view taken along the line K—K in FIG. 2 and illustrates the stacked arrangement of spacer plates and pairs of membranes which form the first and second horizontal flow passages.

In accordance with the present invention, there are also formed horizontally-disposed flow passages which are connected to the vertical flow passages 8, 10. More particularly, as may best be seen in FIGS. 10, 11, each of the spacer plates 3 include grooves 6 formed in the upper and lower surfaces thereof. In the stacked configuration of the spacer plates, grooves 6 cooperate to form horizontal flow passages or channels 6 for the flow of one fluid between membranes 4 and spacer plates 3. Pairs of membranes 4, 4 are disposed within the grooves 6 to form horizontal flow passages or channels 5 between the membranes 4 for the flow of a different fluid. As will be noted, channels 5 are disposed within channels 6. It will be seen that grooves 6 are laid out in substantially the shape of a V to form a V-shaped area about vertical flow passage 8.

Although there are many possible applications of the present invention, when the present invention is embodied in an artificial kidney, the channels 5 constitute the channels for the flow of blood, and the channels 6 constitute the channels for the flow of purifying liquid. The blood is supplied to the device via an inlet 8a and vertical flow passage 8. From flow passage 8, the blood is distributed between membranes 4, 4 through horizontal channels 5 with the use of blood buttons of the construction shown, for example, in U.S. Pat. No. 3,837,496 (corresponding Swedish Pat. No. 355,293).

Figure 11:
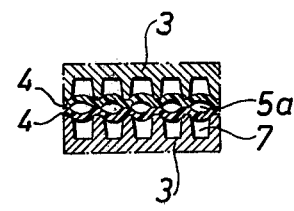
FIG. 11 is a cross-sectional view taken along the line L—L in FIG. 2 and illustrates two spacer plates clamped together having a pair of membranes disposed therebetween to form a portion of the first and second horizontal flow passages.

As will be seen most clearly in FIGS. 4 and 11, spacer plates 3 are also provided with grooves 7, and the membranes 4, 4 are disposed within grooves 7 to form channels 5a for the flow of blood. Grooves 9 are also provided in spacer plates 3, and grooves 7 are arranged to connect grooves 9. As will also be seen from FIG. 2, grooves 7 and 9 are also laid out in a V-shape about vertical flow passage 10, located as close to the point of the V as possible. Vertical flow passage 10, in an artificial kidney is intended for the supply and withdrawal of purifying liquid. The purifying liquid is distributed from vertical flow passage 10 through channels 6 and grooves 7 via channels and apertures 11, 12, 13, and 14, as shown most clearly in FIG. 5. A similar distribution system is described in detail in Swedish published specification No. 365,119.

As will be seen from FIGS. 1 and 2, vertical flow passages 8, 10 are arranged on the bisectrix of the V-shaped area formed by grooves 6. Along this bisectrix, a further groove 15 is provided in spacer plates 3. Groove 15 is intended to facilitate the outflow of blood when the device is lifted and turned on its edge for emptying. For the same purpose, a groove 16 is provided in spacer plate 3 on one side of vertical flow passage 10. In this embodiment, groove 16 is arc shaped, but, alternatively, it may be angular in shape. Since groove 16 is continuous, it facilitates the even distribution of the purifying liquid from vertical flow passage 10.

Referring again to FIG. 1, it will be noted that a seal 17 is provided along the periphery of spacer plate 3. The construction of seal 17 is shown in FIG. 3 and is disposed in a recess 18 which is shallower than the height of seal 17. Therefore, when spacer plates 3 and membranes 4 are arranged in a stacked configuration, seals 17 can be clamped tightly together. It will also be noted that adjacent the V-shaped areas at both ends of each spacer plate 3, seal 17 is indented inwardly from the periphery of the spacer plate 3 so as to closely surround the V-shaped areas. Advantageously, such an arrangement of seal 17 further reduces the quantity of blood remaining in the device after it is emptied.

Referring again to FIG. 3, it will be noted that the opening 8 in spacer plates 3 forming vertical flow passage 8 is shown in detail. The opening 8 is surrounded by annular sealing beads 20, 21 which are intended to form a seal by pressing adjoining membranes 4 against the blood button located between the membranes. Such construction is described in detail in Swedish Pat. No. 355,293.

Referring to FIG. 5, it will be noted that opening 10 forming vertical flow passage 10 is surrounded by an annular sealing bead 27. This seal is intended to press intervening membranes 4 against an annular surface 28 formed on the lower side of spacer plates 3 and shown in FIG. 3. Similarly, an annular sealing bead 29, formed on the upper surface of plate 3, is shown in FIG. 3 and is intended to press the intervening membranes 4 against a corresponding annular sealing surface 30, which is shown in FIG. 5.

Figure 8:
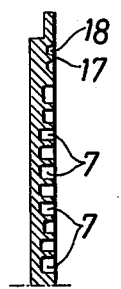
FIG. 8 is a cross-sectional view taken along the line E—E in FIG. 1 and illustrates in detail the grooves formed in one of the V-shaped areas of the spacer plate.
Figure 9:
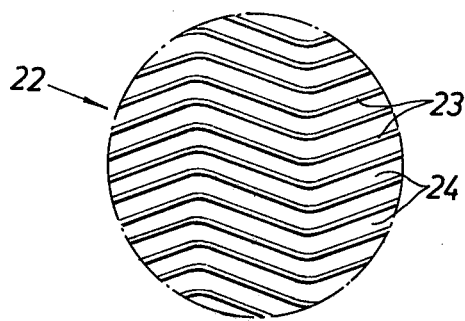
FIG. 9 is a top view, illustrating in an enlarged scale, the area enclosed by a circle designated 22 in the working surface of the spacer plate shown in FIG. 1.

Referring to FIG. 9, there is shown in detail a portion 22 of the working surface of spacer plate 3. The working surface consists of zigzag-shaped ridges 23 having channels 24 between the ridges 23 for the flow of blood. Of course, other working surfaces may be employed, such as that shown in U.S. Pat. No. 3,411,630.

As will also be noted from FIG. 7, the V-shaped ends of spacer plate 3 are connected to the working surface of spacer plate 3 along the periphery of the working surface by bridge members 25. FIG. 7 also illustrates edge members 26 which are raised above spacer plate 3 and thereby produce a dish-shape to facilitate the stacking of plates 3 and membranes 4 on top of one another.

Referring to FIGS. 1 and 2, spacer plates 3 are shown to include cutout portions 31 which are unsymmetrically located about the periphery and are intended to facilitate the mechanical stacking of spacer plates 3 which are alternately turned through 180° in their own plane in relation to one another.

It should also be noted that the present invention has application to dialysis devices which are constructed to include only single membranes, instead of a pair of membranes, disposed between single spacer plates.

As explained above, the present invention has been illustrated as being embodied in an artificial kidney used for the purification of blood. However, as will be understood by anyone skilled in the art, the present invention also has many other applications. For example, the present invention may be used for the oxygenation of blood, wherein one of the fluids is blood and the other fluid is oxygen or an oxygen mixture. Alternatively, the present invention may be used for the transfer of a substance from one gas to another gas. Accordingly, it should be clear that the term fluid in the present invention covers gases as well as liquids.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An apparatus for diffusing matter between a first and second fluid comprising a plurality of spacer plates, a plurality of semipermeable membranes, said spacer plates and said semipermeable membranes each including first and second openings for said first and second fluids, respectively, said spacer plates and said semipermeable membranes being arranged in a stacked configuration so that said first and second openings form first and second vertical flow passages disposed perpendicular to said spacer plates, said first fluid adapted to flow through said first vertical flow passage and said second fluid adapted to flow through said second vertical flow passage, said spacer plates including grooves formed in the upper and lower surfaces thereof which in their stacked configuration cooperate to form horizontal flow passages being disposed parallel to said spacer plates and being connected to said first and second vertical flow passages, said grooves adjacent at least one end of said spacer plates being laid out in the upper and lower surfaces of said spacer plates substantially in the shape of a first V to form a first V-shaped flow path, said first V-shaped flow path enclosing said first and second vertical flow passages and being disposed along the bisectrix of said first V-shaped flow path, said second vertical flow passage being disposed at the point of said first V-shaped flow path, at least one semipermeable membrane being disposed within each of said horizontal flow passages so that said first fluid is adapted to flow on one side of said membrane and said second fluid is adapted to flow on the other side of said membrane, said arrangement providing for the improved flow of said first and second fluids within said apparatus.

2. An apparatus in accordance with claim 1 wherein a V-shaped flow path is arranged at each end of said spacer plates, and the points of said V-shaped flow paths are disposed at the ends of said spacer plates.

3. An apparatus in accordance with claim 1 wherein grooves are formed in said spacer plate connecting said first and second vertical flow passages along said bisectrix so that the apparatus may be emptied of fluid more completely upon being turned on its edge.

4. An apparatus in accordance with claim 1 wherein each of said spacer plates includes a continuous sealing flange extending along the periphery thereof, and wherein said sealing flange extends along said first V-shaped flow path.

5. An apparatus in accordance with claim 4 wherein said sealing flange is disposed in a recess formed within said spacer plate, said recess being shallower than the height of said sealing flange.

6. An apparatus in accordance with claim 1 wherein an arc-shaped groove is formed in said spacer plates adjacent said first vertical flow passage to facilitate the flow of said second fluid when said apparatus is emptied.

7. An apparatus for diffusing matter between a first and second fluid comprising a plurality of spacer plates, a plurality of pairs of semipermeable membranes, said spacer plates and said semipermeable membranes each including first and second openings for said first and second fluids, respectively, said spacer plates and said pairs of semipermeable membranes being arranged in a stacked configuration so that said first and second openings form first and second vertical flow passages disposed perpendicular to said spacer plates, said first fluid adapted to flow through said first vertical flow passage and said second fluid adapted to flow through said vertical flow passage, said spacer plates including grooves formed in the upper and lower surfaces thereof which in their stacked configuration cooperate to form first horizontal flow passages between said membranes and said spacer plates for said first fluid, said first horizontal flow passages being disposed parallel to said spacer plates and being connected to said first vertical flow passage, said pairs of semipermeable membranes being disposed within said grooves to form second horizontal flow passages between said membranes for said second fluid, said second horizontal flow passages being disposed parallel to said spacer plates and being connected to said second vertical flow passage, said second horizontal flow passages being disposed within said first horizontal flow passages, said grooves adjacent at least one end of said spacer plates being laid out in the upper and lower surfaces of said spacer plates substantially in the shape of a V to form a V-shaped flow path, said second vertical flow passage being disposed at the point of said V-shaped flow path, a second system of grooves arranged at each end of said spacer plates being laid out in the upper and lower surfaces of said spacer plates substantially in the shape of a second V to form a second V-shaped flow path at each end of said spacer plates, said first and second V-shaped flow paths at each end of said spacer plates being at different angles, said arrangement providing for the improved flow of said first and second fluids within said apparatus.

8. An apparatus for diffusing matter between a first and second fluid comprising a plurality of spacer plates, a plurality of semipermeable membranes, said spacer plates and said semipermeable membranes each including first and second openings for said first and second fluids, respectively, said spacer plates and said semipermeable membranes being arranged in a stacked configuration so that said first and second openings form first and second vertical flow passages disposed perpendicular to said spacer plates, said first fluid adapted to flow through said first vertical flow passage and said second fluid adapted to flow through said second vertical flow passage, said spacer plates including grooves formed in the upper and lower surfaces thereof which in their stacked configuration cooperate to form horizontal flow passages being disposed parallel to said spacer plates and being connected to said first and second vertical flow passages, said grooves adjacent at least one end of said spacer plates being laid out in the upper and lower surfaces of said spacer plates substantially in the shape of a first V to form a first V-shaped flow path, said second vertical flow passage being disposed at the point of said first V-shaped flow path, a second system of grooves is arranged at each end of said spacer plates and is laid out in the upper and lower surfaces of said spacer plates substantially in the shape of a second V to form a second V-shaped flow path at each end of said spacer plates, said first and second V-shaped flow paths at each end of said spacer plates having different angles, at least one semipermeable membrane being disposed within each of said horizontal flow passages so that said first fluid is adapted to flow on one side of said membrane and said second fluid is adapted to flow on the other side of said membrane, said arrangement providing for the improved flow of said first and second fluids within said apparatus.

9. An apparatus in accordance with claim 8 wherein said second V-shaped flow path includes said first vertical flow passage disposed at the point of said second V.

* * * * *